United States Patent
Hartenstein

(10) Patent No.: US 10,218,087 B2
(45) Date of Patent: Feb. 26, 2019

(54) DUAL BAND MIMO ANTENNA AND WIRELESS ACCESS POINT

(71) Applicant: Xirrus, Inc., Thousand Oaks, CA (US)

(72) Inventor: Abraham Hartenstein, Chatsworth, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 158 days.

(21) Appl. No.: 15/446,710

(22) Filed: Mar. 1, 2017

(65) Prior Publication Data

US 2017/0179576 A1     Jun. 22, 2017

Related U.S. Application Data

(63) Continuation-in-part of application No. 14/611,097, filed on Jan. 30, 2015, now Pat. No. 9,729,213.

(60) Provisional application No. 61/933,783, filed on Jan. 30, 2014.

(51) Int. Cl.
| | | |
|---|---|---|
| *H04B 15/02* | (2006.01) | |
| *H01Q 21/30* | (2006.01) | |
| *H01Q 3/24* | (2006.01) | |
| *H01Q 19/10* | (2006.01) | |
| *H01Q 21/20* | (2006.01) | |
| *H01Q 1/00* | (2006.01) | |
| *H01Q 1/52* | (2006.01) | |
| *H01Q 13/08* | (2006.01) | |
| *H01Q 21/06* | (2006.01) | |
| *H01Q 25/00* | (2006.01) | |
| *H04B 7/06* | (2006.01) | |
| *H04B 15/00* | (2006.01) | |
| *H04W 16/28* | (2009.01) | |
| *H04W 84/12* | (2009.01) | |

(52) U.S. Cl.
CPC ............. *H01Q 21/30* (2013.01); *H01Q 1/007* (2013.01); *H01Q 1/523* (2013.01); *H01Q 3/24* (2013.01); *H01Q 13/085* (2013.01); *H01Q 19/106* (2013.01); *H01Q 21/064* (2013.01); *H01Q 21/205* (2013.01); *H01Q 25/00* (2013.01); *H04B 7/0608* (2013.01); *H04B 15/00* (2013.01); *H04B 15/02* (2013.01); *H04W 16/28* (2013.01); *H04W 84/12* (2013.01)

(58) Field of Classification Search
CPC ......... H01Q 21/30; H01Q 1/523; H04B 15/02
See application file for complete search history.

(56) References Cited

U.S. PATENT DOCUMENTS 5,036,355 A     7/1991     Jairam

*Primary Examiner* — Daniel J Munoz
*Assistant Examiner* — Noel Maldonado
(74) *Attorney, Agent, or Firm* — SoCal IP Law Group LLP; John E. Gunther; Steven C. Sereboff

(57) ABSTRACT

Antenna arrays and access points are disclosed. An antenna array includes first second, third, and fourth antennas formed in a 2×2 grid on a first surface of a planar substrate. Each of the four antennas is linearly polarized in a first direction and provides a roughly cardiod radiation pattern in a plane normal to the first direction. Nulls of the cardiod radiation patterns of the first and second antennas face the third and fourth antennas, respectively, and nulls of the cardiod radiation patterns of the third and fourth antenna face the first and second antennas, respectively.

20 Claims, 13 Drawing Sheets

©2017 Xirrus, Inc.

©2017 Xirrus, Inc.

©2017 Xirrus, Inc.

DUAL BAND MIMO ANTENNA AND WIRELESS ACCESS POINT

RELATED APPLICATIONS

This application is a continuation-in-part of application Ser. No. 14/611,097, filed Jan. 30, 2015, titled MIMO ANTENNA SYSTEM, which claims priority to Provisional Application No. 61/933,783, filed Jan. 30, 2014, titled MIMO ANTENNA SYSTEM, which are incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to generally to wireless communication devices, and more particularly to antennas for wireless access points including Multiple-Input, Multiple-Output (MIMO) radios.

Description of the Related Art

Smart phones, tablet computers, and other wireless communication devices are widely used for data networking. Data networks that use WiFi® ("Wireless Fidelity"), also known as "Wi-Fi," are relatively easy to install, convenient to use, and supported by the Institute of Electrical and Electronic Engineers (IEEE) standard 802.11. The performance of WiFi data networks makes WiFi a suitable alternative to a wired data network for many business and home users.

WiFi networks operate by employing wireless access points that connect user devices (or client devices) in proximity to the access point to varying types of data networks such as, for example, an Ethernet network or the Internet. A wireless access point includes at least one radio that operates according to one or more of the standards specified in different sections of the IEEE 802.11 standard. Wireless access points may include omni-directional antennas that allow the radios within the access point to communicate with client devices in any direction. Alternatively, wireless access points may include directional antennas that allow each radio to communicate with client devices within a respective portion, or sector, of the area surrounding the access point. In this case, the sectors served by the individual radios may be distinct or may overlap. Each wireless access point is also connected to a data network such as the Internet through a backhaul communications link. The backhaul communication link is typically a hard-wired communication path such as an ethernet lick or a fiber optic link, but may also be a wireless communication path. User devices communicate with the data network via the wireless access point and the backhaul communications link.

The IEEE standards that define the radio configurations include:

A. IEEE 802.11a, which operates on the 5 GHz frequency band with data rates of up to 54 Mbs;

B. IEEE 802.11 b, which operates on the 2.4 GHz frequency band with data rates of up to 11 Mbs; and C. IEEE 802.11g, which operates on the 2.4 GHz frequency band with data rates of up to 54 Mbs.

D. IEEE 802.11n, which operates on either the 2.4 GHz frequency band or the 5 GHz frequency band with increased data rates due to the use of multiple input/multiple output (MIMO) radios.

E. IEEE 802.11ac, which operates on the 5 GHz frequency band using MIMO radios with higher data rates than 802.11n.

Both the 2.4 GHz and 5 GHz frequency bands are divided into multiple frequency channels. For example, the 2.4 GHz band is divided into 14 defined frequency channels. Not all countries allow the use of all defined channels. Further, the frequency spacing between adjacent channels in the 2.4 MHz band is only 5 MHz, which is smaller than the bandwidth required for WiFi communications. Thus only three or four non-overlapping channels are typically used at any particular location.

The use of MIMO radios in IEEE Standard 802.11n and 802.11ac results in more stable connections and higher data rates at the expense of requiring multiple antennas for reception and transmission of multiple streams at each radio. Within this patent, the term "channel" means a subdivision of a frequency band, and the term "stream" means the bidirectional signal flow between a radio and an antenna. IEEE 802.11n provides for up to four streams/antennas per radio. IEEE 802.11ac allows up to eight streams/antennas per radio. Commonly, a MIMO radio is defined by a descriptor "R×T", where R is the number of received streams and T is the number of transmitted streams. The number of antennas is equal to the greater of R and T. For example, a "4×4" MIMO radio transmits and receives four streams using four antennas. The need for multiple antennas for MIMO radios complicates the physical design of access points, particularly when the access points include multiple radios.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Description of Apparatus

Figure 1:
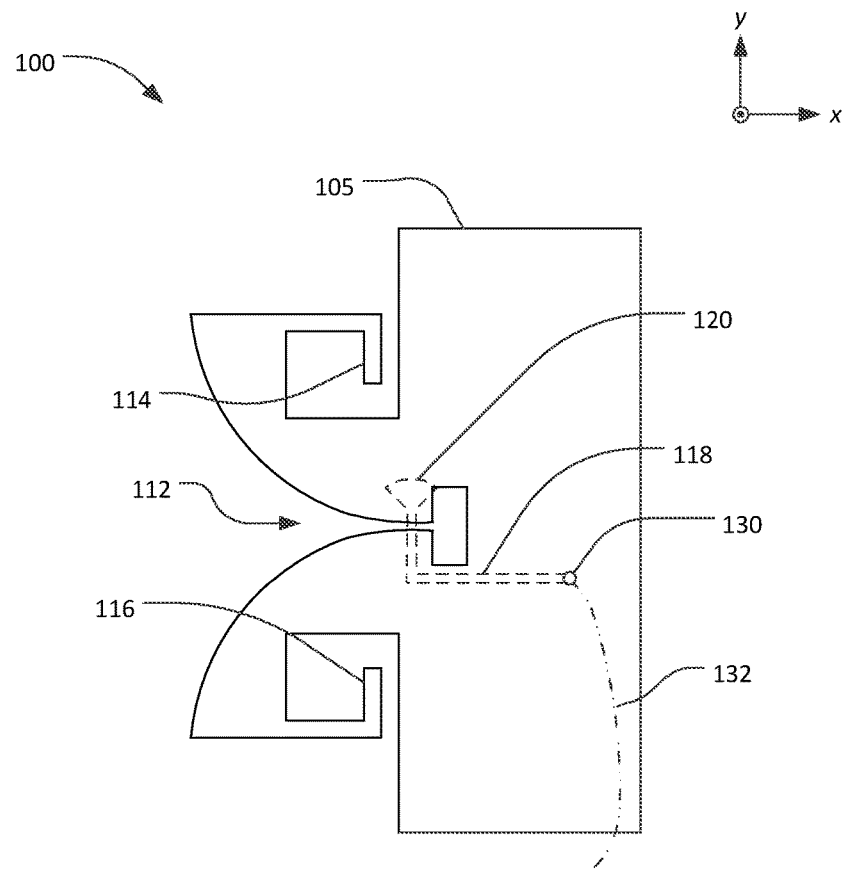
FIG. 1 is a plan view of a dual band antenna element.

FIG. 1 is a plan view of a dual-band antenna element 100, which may be used as a building block in various antenna arrays. In this patent, the term "dual-band" specifically means functional in both the 5 GHz and 2.4 GHz WiFi bands. The dual-band antenna element 100 is formed by a patterned conductive layer on a first side of a dielectric circuit card (not shown). The dual-band antenna element 100 includes a ground plane 105 and a tapered notch 112 extending from the ground plane. The tapered notch 112 is fed by a microstrip line 118 terminated by a radial stub 120, which are formed on a second side of the circuit card. The feed line 118 may terminate at a feed point 130, which may be coupled to a transceiver by, for example, a coaxial cable 132.

The dual-band antenna element 100 may be, or be similar to, a Vivaldi tapered notch antenna. The tapered notch 112 may have an exponential profile or some other profile (e.g. Chebyshev, Klopfstein, Gaussian, etc.). Folded stubs 114/116 extend from both sides of the tapered notch 112. The tapered notch 112 may function as an antenna over a broad bandwidth including the 5 GHz WiFi band. The folded stubs 114/116 may create a resonance at the 2.4 GHz WiFi band.

For ease of discussion, a three-dimensional x-y-z coordinate system is defined. The dual-band antenna element 100 is disposed, by definition, in the x-y plane as shown in FIG. 1. In the claims, the y axis corresponds to a "first direction", the x axis corresponds to a "second direction perpendicular to the first axis", and the x-z plane corresponds to "a plane normal to the first direction." In either the 2.4 GHz or 5 GHz WiFi band, the dual-band antenna element 100 is linearly polarized in the direction of the y axis, which is to say radiation transmitted from, or received by, the antenna element 100 is linearly polarized along the y axis.

Figure 2:
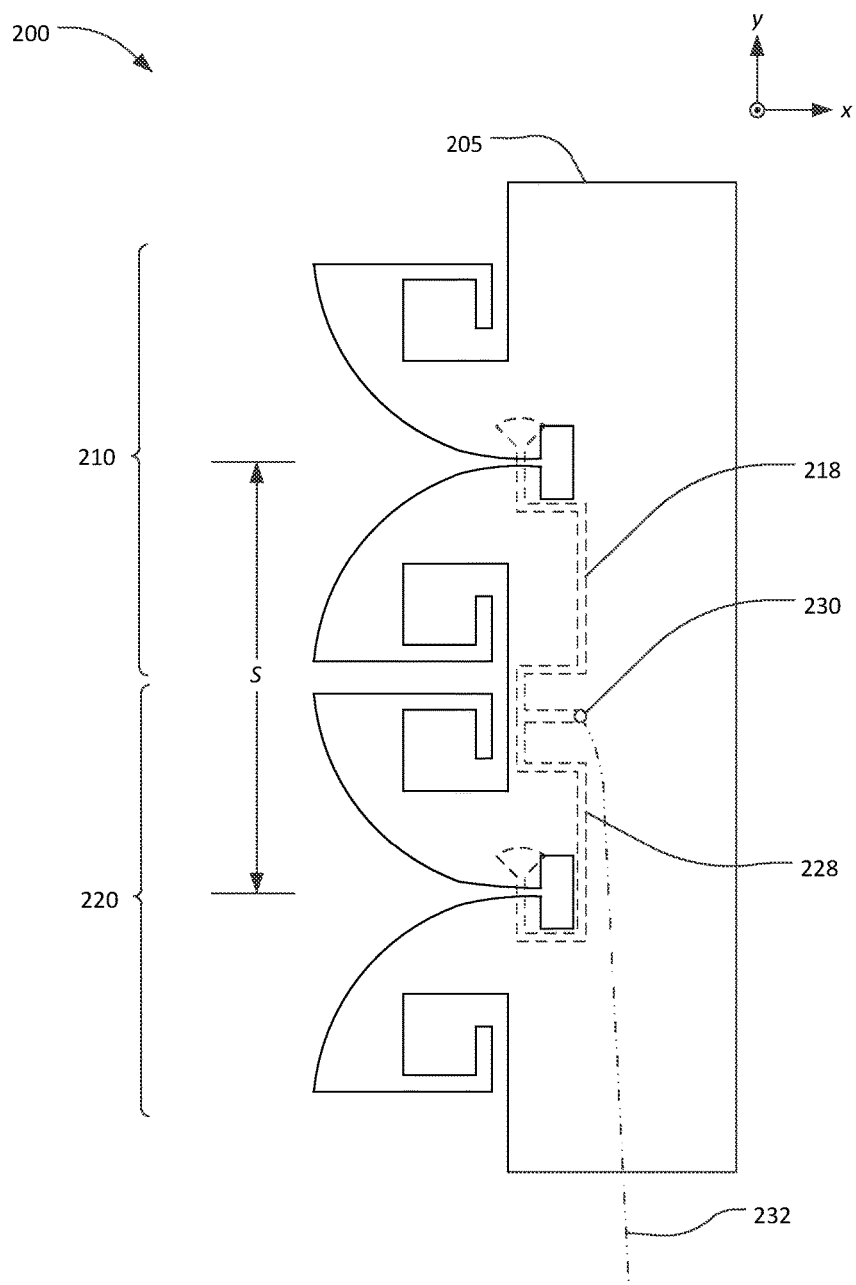
FIG. 2 is a plan view of a dual band antenna sub-array.

FIG. 2 is a plan view of a dual-band antenna sub-array 200, which also may be used as a building block in various antenna arrays. The antenna sub-array 200 is formed by a patterned conductive layer on a first side of a dielectric circuit card (not shown). The antenna sub-array 200 includes a ground plane 205 and two dual-band tapered notch antenna elements 210, 220 that extend from the plane. The two dual-band antenna elements 210, 220 are displaced from each other along the y axis. The dual-band antenna elements 210, 220 may be, or be similar to, the dual-band antenna element 100. Each dual-band antenna element 210, 220 is fed by a respective microstrip feed line 218, 228. The feed lines 218, 228 may terminate at a common node 230, which may be coupled to a transceiver by, for example, a coaxial cable 232.

The spacing S between the two dual-band antenna elements 210, 220 and the lengths of the feed lines 218, 228 are selected such that radiation from the two dual-band antenna elements adds constructively without high sidelobe levels for both the 5 GHz and 2.4 GHz bands.

Figure 3B:
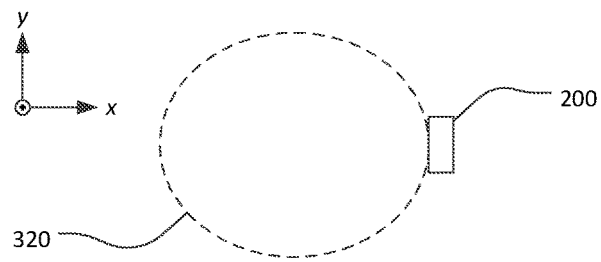
FIG. 3B is a depiction of the radiation pattern of the dual band antenna sub-array in a second plane orthogonal to the first plane.
Figure 3A:
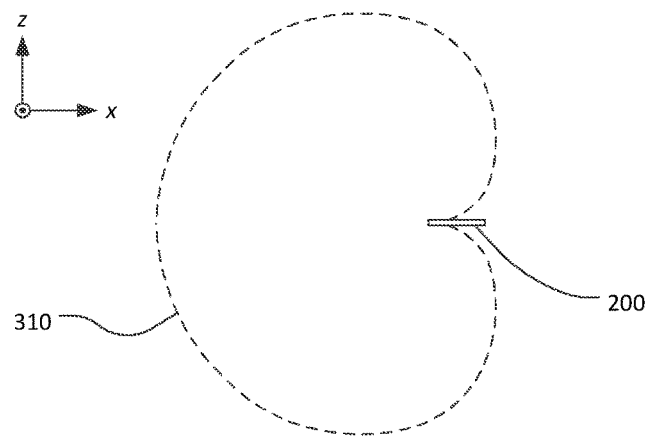
FIG. 3A is a depiction of the radiation pattern of the dual band antenna sub-array in a first plane.

As depicted in FIG. 3A, the radiation pattern of the dual-band antenna sub-array 200 forms a roughly cardiod shape 310 in the x,z plane (normal to the y axis) with a null facing the direction opposite the open end of the tapered notch antenna elements. The term "roughly cardiod" means "a curved shape having a null like a cardiod, but not necessarily a true cardiod." A "true cardiod" is a plane curve generated by a point on the circumference a circle rolling about the circumference of another circle having the same diameter. The radiation pattern of a single dual-band tapered notch antenna element 100 would be similar. As depicted in FIG. 3B, the radiation pattern 320 of the dual-band antenna sub-array 200 forms a roughly elliptical shape in the x,y plane. The term "roughly elliptical" means "oval in shape but not necessarily a true ellipse." Since the dual-band antenna sub-array 200 is polarized along the y axis, the dual-band antenna sub-array 200 does emit or receive in either direction along the y axis. The radiation pattern of a single dual-band tapered notch antenna element 100 would be similar but more circular.

The radiation patterns 310 and 320 of FIG. 3A and FIG. 3B, respectively, exist in the near field, which is to say in close proximity to the antenna sub-array 200. In typical interior WiFi applications, far field radiation patterns are highly influenced by reflections and other environmental factors and may be substantially different from the near field patterns.

Other types of antenna elements may provide radiation patterns similar to the patterns 310, 320 shown in FIG. 3A and FIG. 3B. For example, a printed dual-band slot-fed dipole antenna with an adjacent ground plane may provide a roughly cardiod radiation pattern in the x,z plane and a roughly elliptical pattern in the x,y plane.

Figure 4:
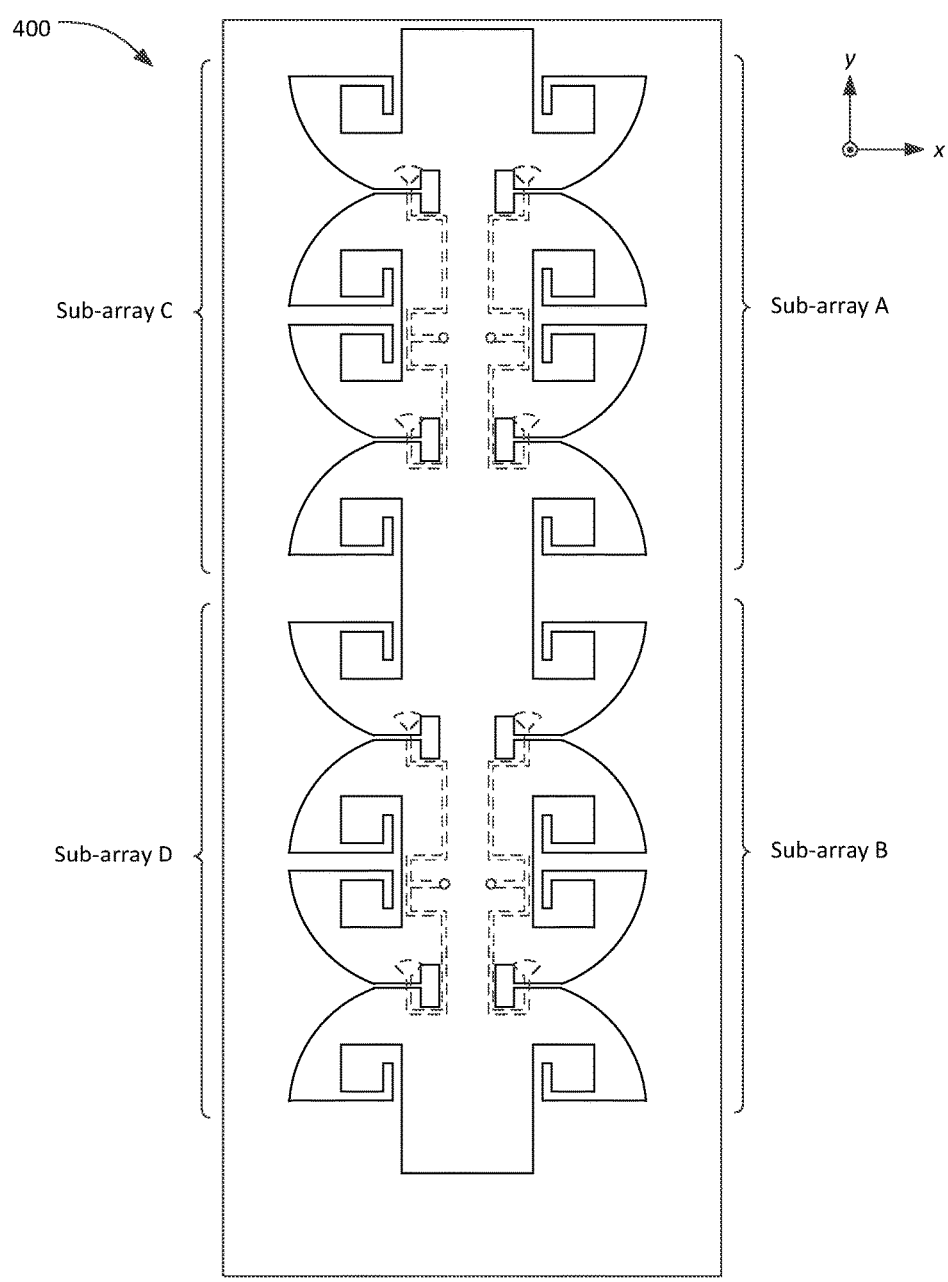
FIG. 4 is a plan view of a dual band antenna array including four sub-arrays.

FIG. 4 is a plan view of an antenna array 400, which includes four dual band antenna sub-arrays, respectively identified as sub-array A, B, C, and D, formed on a common dielectric circuit card (not shown). Each of the four antenna sub-arrays may be a dual band antenna sub-array 200 as shown in FIG. 2. Alternatively, antenna array 400 could include eight independently fed antenna elements such as the tapered notch antenna element 100 of FIG. 1. The antenna sub-arrays or antenna elements may be connected to one or more radios with, for example, respective coaxial cables (not shown).

Antenna sub-array A and antenna sub-array C are offset along the x axis and face in opposing directions. Consideration of FIG. 3A shows that antenna sub-array C is located in the null of the cardiod radiation pattern of antenna sub-array A. Conversely, antenna sub-array A is located in the null of the cardiod radiation pattern of antenna sub-array C. Thus antenna sub-arrays A and C are inherently isolated from each other. Antenna sub-arrays B and D are similarly isolated.

Antenna sub-array A and antenna sub-array B are offset along the y axis. Consideration of FIG. 3B shows that antenna sub-array B is located in a null of the roughly elliptical radiation pattern of antenna sub-array A. Conversely, antenna sub-array B is located in a null of the roughly elliptical radiation pattern of antenna sub-array A. Thus antenna sub-arrays A and B are inherently isolated from each other. Antenna sub-arrays C and D are similarly isolated. Although antenna sub-arrays A, B, C, and D are formed in close proximity on a common dielectric circuit card and share a common ground plane, the four antenna sub-arrays are mutually isolated. For example, radiation from any one of the antenna sub-arrays may be attenuated by 40 dB or more at each of the other three antenna sub-arrays.

The antenna array 300 is exemplary. An antenna array may have only two sub-arrays, such as, for example, only sub-array A and sub-array C. Antenna arrays may have more than four sub-arrays, with additional sub-arrays added in pairs displaced along the y axis.

Figure 5B:
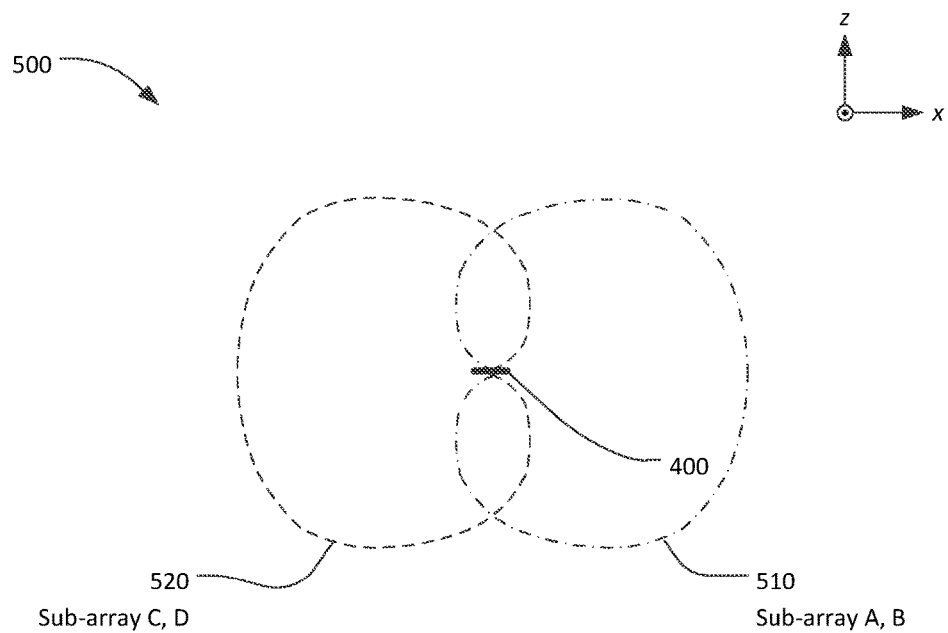
FIG. 5B is a depiction of the azimuth radiation pattern of the dual band antenna array of FIG. 5A.
Figure 5A:
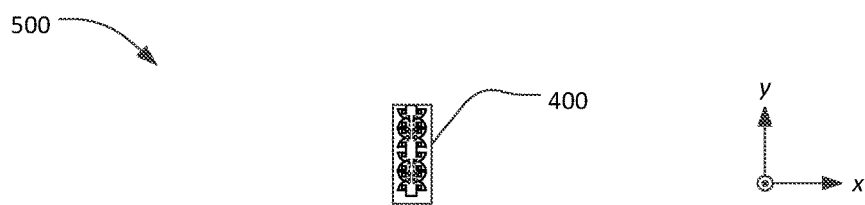
FIG. 5A is side view of an environment including a dual band antenna array.

FIG. 5A is a side view of an environment 500 including an antenna array 400, as shown in FIG. 4, mounted above a floor or ground surface with the previously-defined y-axis of the antenna array vertical. For example, the antenna array 400 may be mounted on top of a pole or other structure (not shown), or suspended from a ceiling (not shown). FIG. 5B is a top view (i.e. a view along the y-axis normal to the x-z plane) of the environment 500 showing the radiation patterns from the antenna array 400. The radiation from sub-arrays A and B form overlapping cardiod shapes 510 with a null to the left (as shown in FIG. 5B) of the antenna array 400. Similarly, the radiation from sub-arrays C and D form overlapping cardiod shapes 520 with a null to the right (as shown in FIG. 5B) of the antenna array 400.

Connections between the antenna array 400 and one or more radios can be configured accommodate different situations and requirements. For example, in an "omni mode", sub-arrays A and C may be connected to a first 2×2 MIMO radio and sub-arrays B and D may be connected to a second MIMO radio (2×2). In this case, each radio has omnidirectional coverage (with at least one antenna sub-array) of the environment 500 with high isolation between the two radios. Alternatively, in a "sectored mode", sub-arrays A and B may be connected to the first 2×2 MIMO radio and sub-arrays C and D may be connected to the second 2×2 MIMO radio. In this case, each radio will cover a sector more than 180° but less than 360° in azimuth, with high isolation between the two radios. Other possible configurations include all four sub-arrays may be connected to a single 4×4 MIMO radio to provide omni-directional coverage with at least two antenna sub-arrays. Finally, the four antenna sub-arrays may be connected to four separate (non-MIMO) radios.

Figure 6:
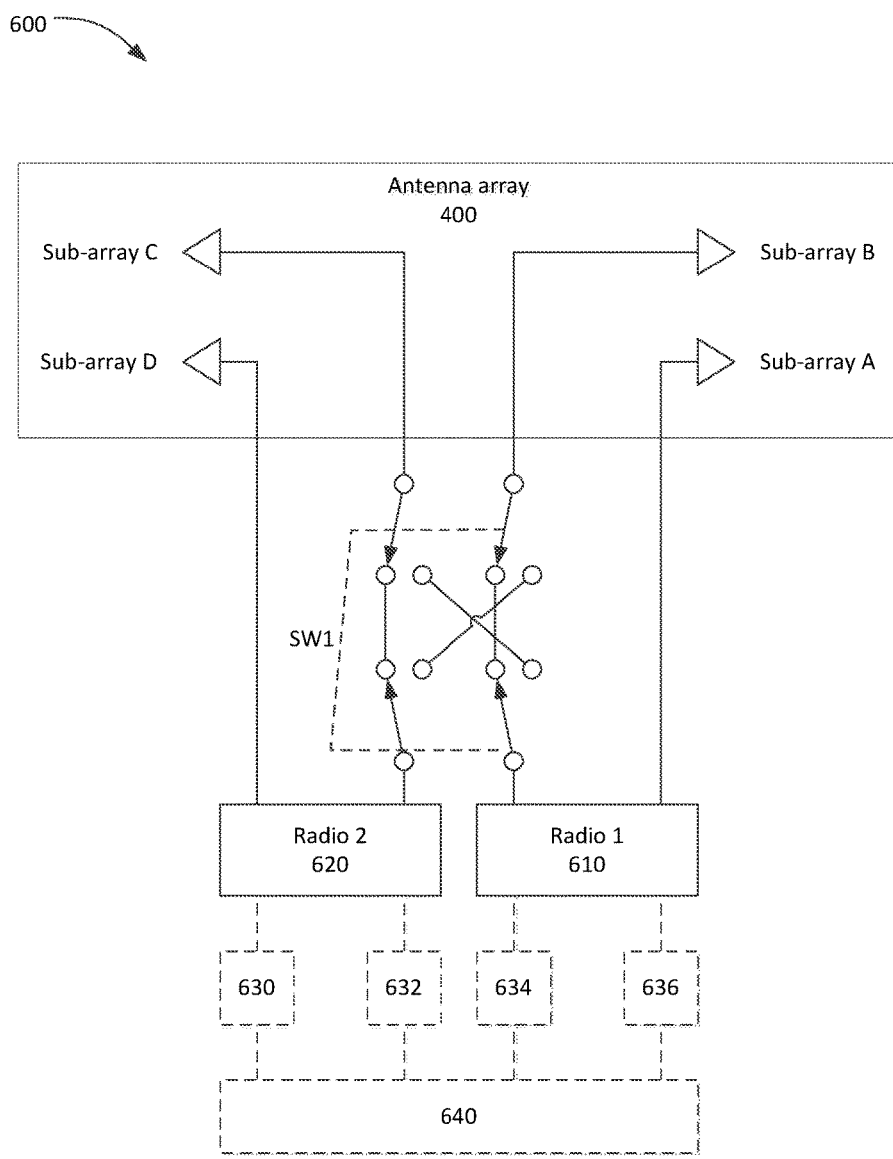
FIG. 6 is a block diagram of an access point with dynamic reconfiguration of a dual band antenna array.

FIG. 6 is a block diagram of an access point 600 is which an antenna array 400, as shown in FIG. 4, can be dynamically reconfigured between the omni mode and the sectored mode described in the previous paragraph. The access point 600 includes the antenna array 400, two dual-band 2×2 w MIMO radios 610, 620, and a double-pole, double-throw RF switch SW1. With the switch SW1 in the position shown in FIG. 6, the access point 500 is configured in the sectored mode. Radio 1 610 is connected to sub-array A and sub-array B, and radio 2 620 is connected to sub-array C and sub-array D of the antenna array 400. With the switch SW1 in its other position (not shown), the access point 600 is configured in the omni mode. Radio 1 610 is connected to sub-array A and sub-array C, and radio 2 620 is connected to sub-array B and sub-array D of the antenna array 400. The switch SW1 may be controlled, for example, by a processor (not shown) within the access point 600 to dynamically select the best mode in view of the user devices communication with the access point.

Alternatively, the antenna array 400 may be coupled to four single-stream (non-MIMO) radios 630, 632, 634, 636, or a single 4×4 MIMO radio 640. In either case, the switch SW1 would not be present.

Figure 7:
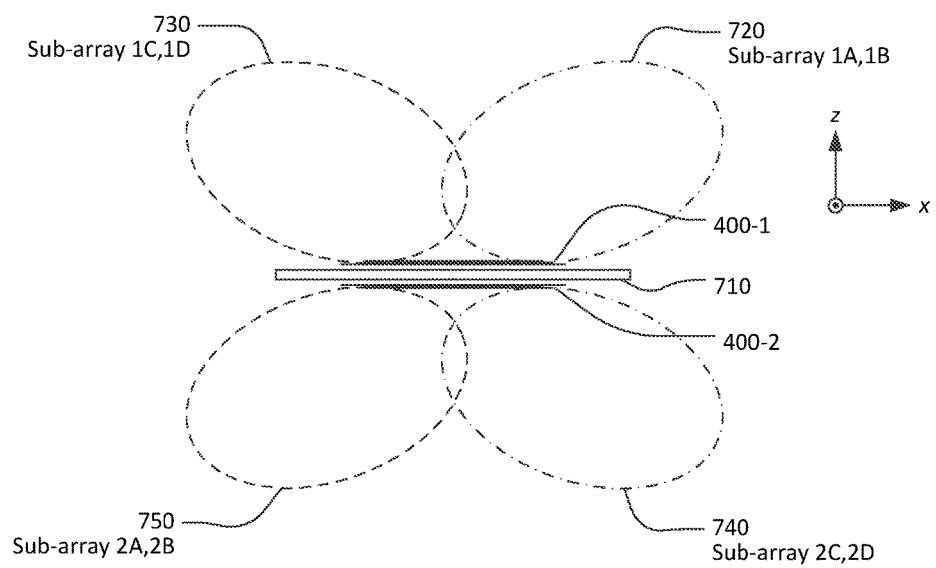
FIG. 7 is a depiction of the azimuth radiation patterns of two dual band antenna arrays disposed adjacent to opposing sides of a ground plane.

In some applications, it may be desirable to constraint each radio to a more limited geographical sector. To this end, a first antenna array 400-1 may be mounted parallel to and in close proximity to a ground plane 710, as shown in FIG. 7. In this context, "close proximity" means "at a distance less than a wavelength of operation of the antenna array." For example, the first antenna array 400-2 may be mounted about 0.45 inches from the ground plane 710 (roughly ¼ wavelength at 5 GHz). Optionally, a second antenna array 400-2 may be mounted parallel to and in close proximity to the other side of the ground plane 710. Both antenna arrays 400-1, 400-2 may be the antenna array 400 of FIG. 4. In this case, each sub-array within both antenna arrays has a tilted, roughly ellipsoidal radiation pattern with little, if any, radiation parallel to the x-y plane of the antenna arrays 400-1, 400-2. Specifically, the radiation pattern of sub-arrays 1A and 1B (i.e. the A and B sub-arrays of antenna array 400-1) is represented by the line 720, the radiation pattern of sub-arrays 1C and 1D is represented by the line 730, the radiation pattern of sub-arrays 2A and 2B is represented by the line 750, and the radiation pattern of sub-arrays 2C and 2D is represented by the line 740. All of the sub-arrays are mutually isolated.

Figure 8:
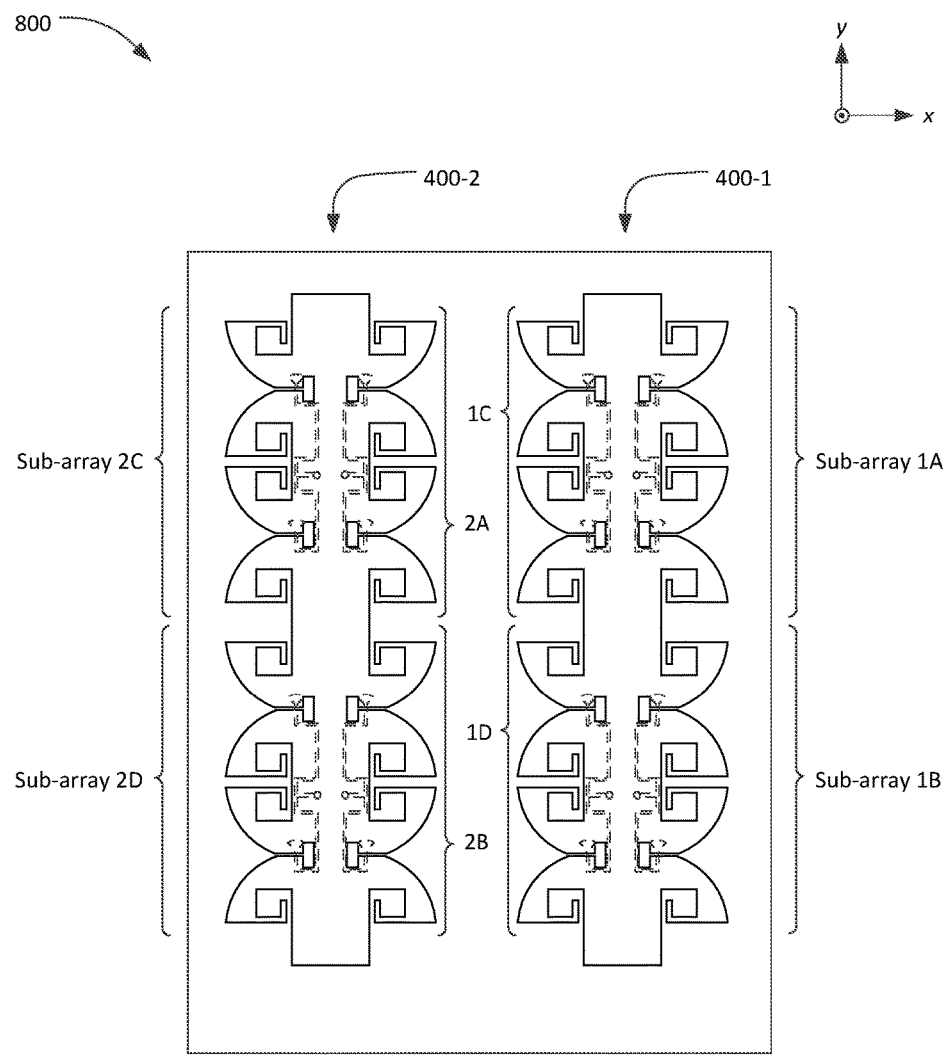
FIG. 8 is a plan view of a dual band antenna array including eight sub-arrays.

FIG. 8 is a plan view of an eight sub-array antenna array 800, which includes two four sub-array antenna arrays 400-1, 400-2 formed on a common dielectric circuit card (not shown) displace from each other along the x axis. Each of the four sub-array antenna arrays 400-1, 400-2 is essentially the same as the antenna array 400 shown in FIG. 4. Antenna array 400-1 includes four sub-arrays, identified as 1A, 1B, 1C, and 1D. Antenna array 400-2 includes four additional sub-arrays, identified as 2A, 2B, 2C, and 2D. Each of the eight sub-arrays may be, or be similar to, the dual band antenna sub-array 200 as shown in FIG. 2. The eight sub-arrays may be connected to two or more radios with, for example, respective coaxial cables (not shown).

As previously described, the four sub-arrays 1A, 1B, 1C, 1D of antenna array 400-1 are mutually isolated. Similarly, the four sub-arrays 2A, 2B, 2C, 2D of antenna array 400-2 are mutually isolated. However, the four sub-arrays 1A, 1B, 1C, 1D of antenna array 300-1 are not necessarily isolated from the four sub-arrays 2A, 2B, 2C, 2D of antenna array 300-2. In particular, sub-array 1C is not inherently isolated from sub-array 2A, and sub-array 1D is not inherently isolated from sub-array 2B.

Figure 9B:
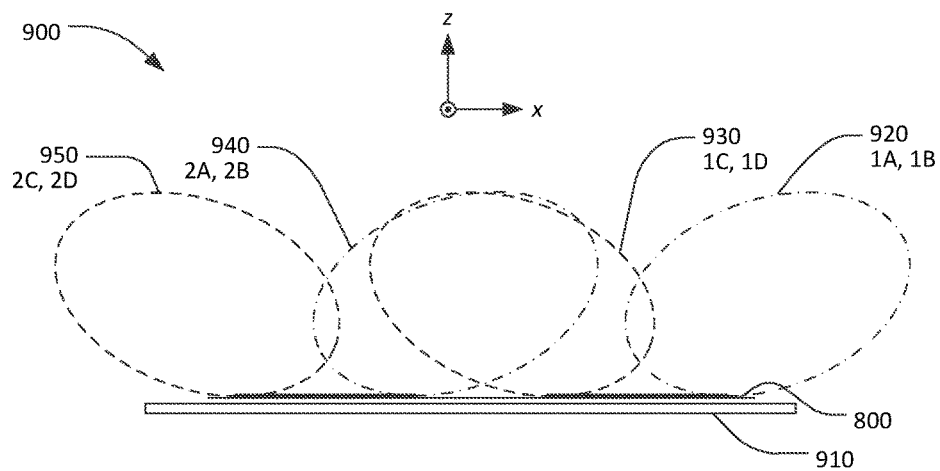
FIG. 9B is a side view depicting the radiation patterns of the dual band antenna array of FIG. 5 connected to two MIMO radios as shown in FIG. 7A.

To provide mutual isolation between all eight sub-arrays, an eight sub-array antenna array 800 may be mounted parallel to and in close proximity to a ground plane 910, as shown in FIG. 9B. For example, the antenna array 800 may be mounted about 0.45 inches from the ground plane 910 (roughly ¼ wavelength at 5 GHz). In this case, each sub-array has a tilted, roughly ellipsoidal radiation pattern with little, if any, radiation parallel to the x-y plane of the antenna array 800. Specifically, the radiation pattern of sub-arrays 1A and 1B is represented by the line 920, the radiation pattern of sub-arrays 1C and 1D is represented by the line 930, the radiation pattern of sub-arrays 2A and 2B is represented by the line 940, and the radiation pattern of sub-arrays 2C and 2D is represented by the line 950. Since there is little radiation in the plane of the antenna array 800, all of the sub-arrays are mutually isolated. For example, the isolation between any pair of sub-arrays may be 40 dB or greater.

Figure 9A:
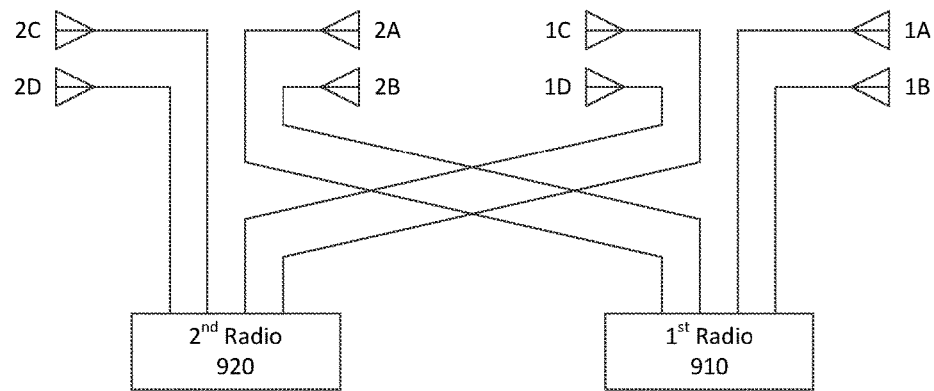
FIG. 9A is block diagram showing connections between two 4×4 MIMO radios and an antenna array in a first configuration.

The antenna array 800 may be connected to a pair of 4×4 MIMO radios in either an "omni mode" or a "sectored mode". The sectored mode is illustrated in FIG. 9A and FIG. 9B. A first 4×4 MIMO radio 910 is connected to sub-arrays 1A, 1B, 2A, and 2C. The coverage of the first radio, represented by the dash-dot lines 920 and 940 is roughly half of the x-z plane. A second 4×4 MIMO radio 920 is connected to sub-arrays 1C, 1D, 2C, and 2D. The coverage of the second radio, represented by the dashed lines 930 and 950 is roughly the other half of the x-z plane.

Figure 10B:
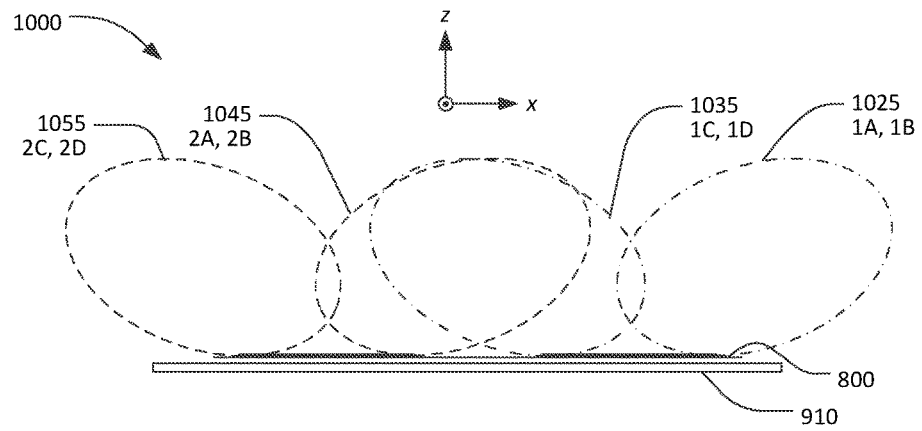
FIG. 10B is a side view depicting the radiation patterns of the dual band antenna array of FIG. 5 connected to two MIMO radios as shown in FIG. 8A.
Figure 10A:
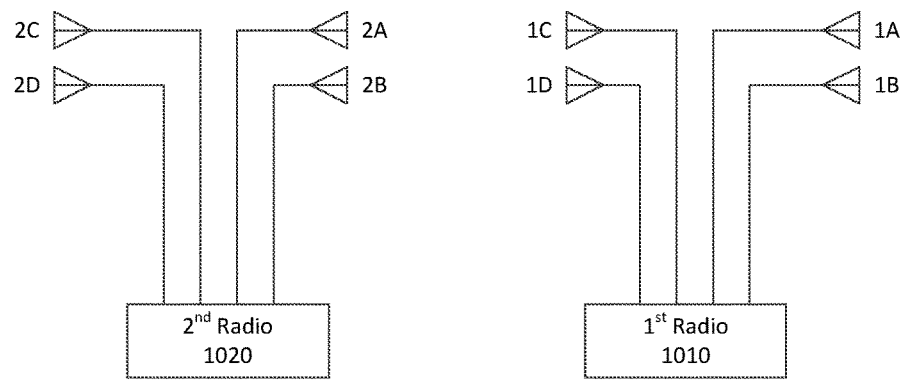
FIG. 10A is block diagram showing connections between two 4×4 MIMO radios and an antenna array in a second configuration.

The omni mode is illustrated in FIG. 10A and FIG. 10B. A first 4×4 MIMO radio 1010 is connected to sub-arrays 1A, 1B, 1C, and 1D. The coverage of the first radio, represented by the dash-dot lines 1025 and 1035, is all, or nearly all, of the x-z plane. A second 4×4 MIMO radio 1020 is connected to sub-arrays 2A, 2B, 2C, and 2D. The coverage of the second radio, represented by the dashed lines 1045 and 1055 is also all, or nearly all, of the x-z plane. Dynamic switching between the omni and sectored modes is possible using a four pole, double throw, RF switch (not shown).

FIG. 9A and FIG. 10A illustrate the eight-antenna antenna array 800 coupled to two 4×4 MIMO radios. The antenna array may be used with other radio configurations including eight single-stream (non-MIMO) radios, four 2×2 MIMO radios, or a single 8×8 MIMO radio.

Figure 11:
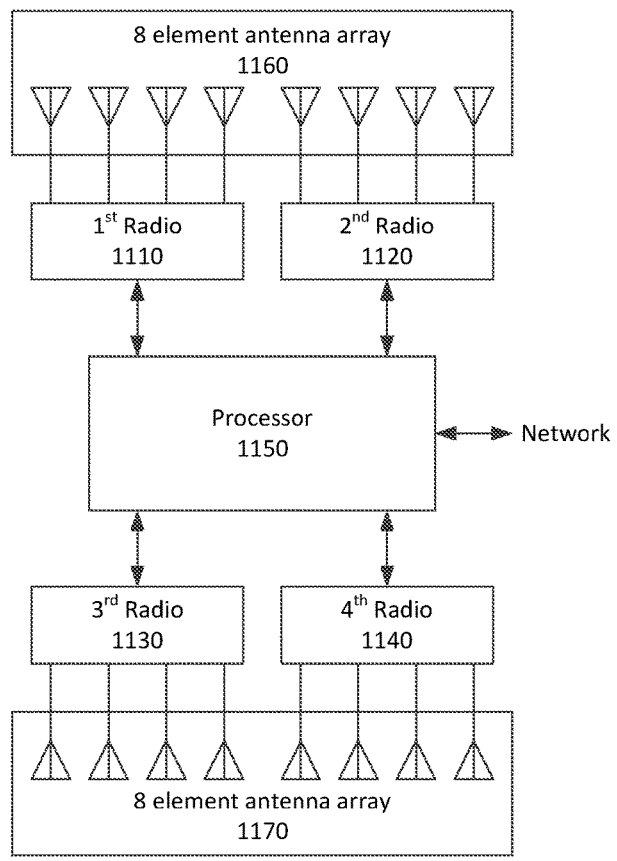
FIG. 11 is a block diagram of an access point including four 4×4 MIMO radios.

Referring now to FIG. 11, a wireless access point 1100 may include first, second, third, and fourth radios 1110, 1120, 1130, 1140 and one or more data processor 1150 within a common housing. Each radio 1110, 1120, 1130, 1140 may be a 4×4 MIMO radio. The first radio 1110 is coupled to four sub-arrays of a first eight-element antenna array 1160. The second radio 1120 is coupled to the other four sub-arrays of the first eight-element antenna array 1160. Similarly, the third and fourth radios 1130, 1140 are each coupled to four sub-arrays of a second eight-element antenna array 1170. Each of the first and second eight-element antenna arrays 1160, 1170 may be an eight-sub-array antenna array 800 as shown in FIG. 8. Each radio may be coupled to the respective antenna sub-arrays in a sectored mode or an omni mode as shown in FIG. 9B and FIG. 10B, respectively.

Radios 1110, 1120, 1130, 1140 each transmit and/or receive four streams via the respective four antenna sub-arrays. All four streams of each radio 1110, 1120, 1130, 1140 use the same frequency channel. Typically, the four radios 1110, 1120, 1130, 1140 operate at different frequency channels which may or may not be within the same frequency band.

The processor 1150 performs or provides functions to bidirectionally transfer data between the four radios 1110, 1120, 1130, 1140 and a network. The processor 1150 includes interfaces for exchanging frames and other data with the four radios 1110, 1120, 1130, 1140, and for exchanging frames and other data with the network. The processor 1150 may include multiple interfaces to the network and/or the four radios 1110, 1120, 1130, 1140 with failover support between interfaces. Data to/from each radio 1110, 1120, 1130, 1140 may be transferred to the network via shared or individual wired, fiber-optic, or wireless communication paths. The network may be, for example, a local area network or a wide area network which may be or include the Internet, or some other network. Preferably, the data processor 1150 exchanges data between the four radios 1110, 1120, 1130, 1140 and the network via a high speed communications path. For example, the data processor 1150 may communicate with the network via a 10 Mbs (megabits per second), 100 Mbs, 1 Gbs (gigabits per second), 2.5 Gbs, 5 Gbs or 10 Gbs Ethernet interface.

The data processor 1150 provides IEEE 802.11 media access control (MAC) services for the four radios 1110, 1120, 1130, 1140. To this end, the data processor 1150 may include receiver and transmitter queues for the network interface and each radio 1110, 1120, 1130, 1140, and a queue controller to manage the flow of data frames entering and exiting the queues. The data processor may perform other functions and services.

The functions and services provided by the data processor 1150 may be implemented by software running on a suitable processor, by hardware that may include one or more application specific integrated circuits (ASIC) and/or one or more field programmable gate arrays, or by a combination of hardware and software. All, some, or none of the functions and services provided by the data processor 1150 may implemented by common hardware (or a common processor) shared between the four radios 1110, 1120, 1130, 1140. All, some, or none of the functions and services provided by the data processor 1150 may implemented by unique hardware (or unique processors) dedicated to individual radios.

Figure 12:
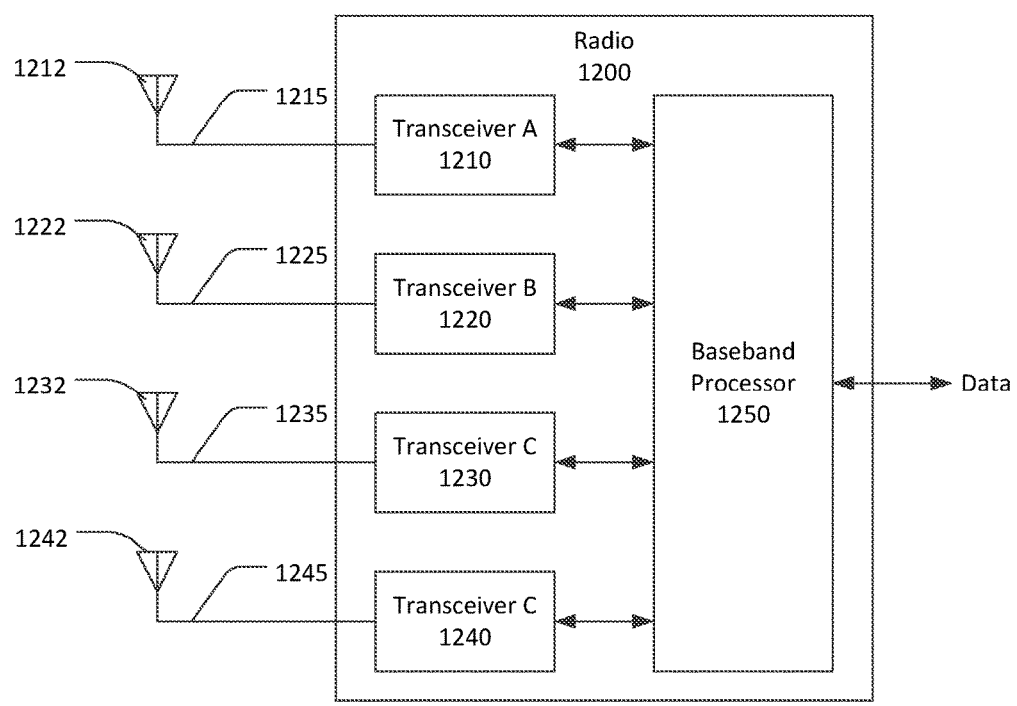
FIG. 12 is a block diagram of a MIMO radio.

FIG. 12 is a block diagram of a four-stream radio 1200 which may be suitable for use as the radios 1110, 1120, 1130, 1140 of the wireless access point 1100. The four-stream radio 1200 includes four transceivers 1210, 1220, 1230, 1240 and a baseband processor 1250. The four-stream radio 1200 sends and receives four streams 1215, 1225, 1235, 1245 via respective antennas 1212, 1222, 1232, 1242. The antennas 1212, 1222, 1232, 1242 may be dual band antenna sub-arrays 200 as shown in FIG. 2, which may be portions of the antenna arrays 400 or 800 as shown in FIG. 4 and FIG. 8, respectively. The transceivers 1210, 1220, 1230, 1240 process signals received at the corresponding antennas 1212, 1222, 1232, 1242 to extract a baseband signal. The transceivers 1210, 1220, 1230, 1240 also modulate the baseband signals received from the baseband processor 1250 for transmission via the antennas 1212, 1222, 1232, 1242. The baseband processor 1250 processes the baseband signals being sent or received by the four-stream radio 1200.

The functions and services provided by the baseband processor 1250 may be implemented by software running on a suitable processor, by hardware that may include one or more application specific integrated circuits (ASIC) and/or one or more field programmable gate arrays, or by a combination of hardware and software. All, some, or none of the functions and services provided by the baseband processor 1250 may implemented by common hardware (or a common processor) shared between the four transceivers 1210, 1220, 1230, 1240. All, some, or none of the functions and services provided by the baseband processor 1250 may implemented by unique hardware (or unique processors) dedicated to individual transceivers.

Figure 13:
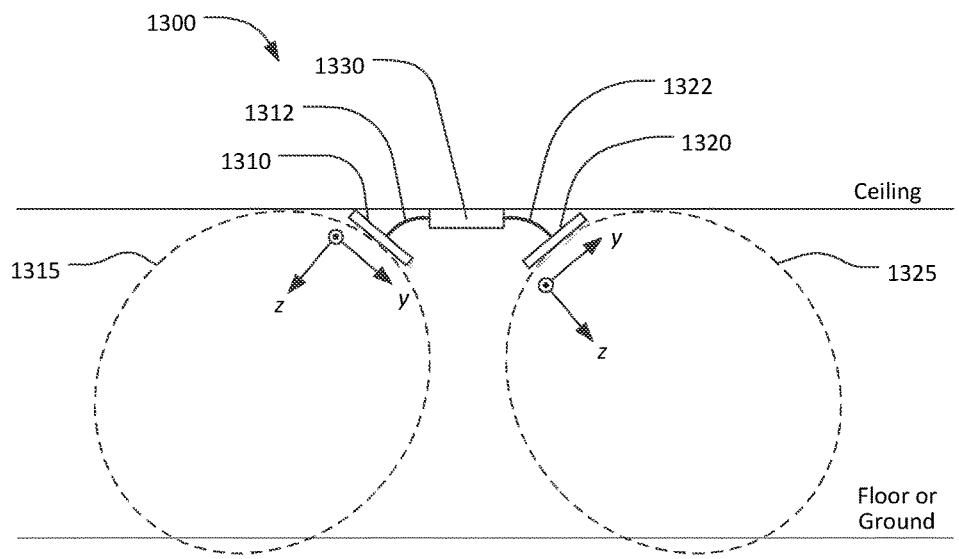
FIG. 13 is a side view of an access point including four 4×4 MIMO radios and two dual band antenna arrays.

FIG. 13 is a block diagram of an access point 1300 installed in an environment. The access point 1300 may be, or be similar, to the access point 1100 shown in FIG. 11. The access point 1300 includes a first antenna array 1310, a second antenna array 1320, and a housing 1330 containing four 4×4 MIMO radios. Independent coordinate systems are indicated for each antenna array 1310, 1320. Each of the four MIMO radios in the housing 1330 may be, or be similar to, the 4×4 radio 1200 shown in FIG. 12. Each of the first and second antenna arrays 1310, 1320 may be an eight sub-array antenna array 800 as shown in FIG. 8. Each radio may be connected to four sub-arrays of one of the antenna arrays 1310, 1320 in either sectored mode (as shown in FIG. 9A) or an omni mode (as shown in FIG. 10A).

The first and second antenna arrays 1310 and 1320 may be mounted to the housing 1330 or may be detached from the housing 1330 as shown in FIG. 13. When detached, the first and second antenna arrays 1310, 1320 may be connected to the housing 1330 by respective RF cables 1312, 1322. Detaching the antenna arrays 1310, 1320 from the housing 1330 may increase the isolation between the antenna arrays. The antenna arrays 1310, 1320 may mounted on articulated arms (not shown) that allow the antenna arrays to be rotated about their respective x axes, such that the y axis of each antenna array is tilted with respect to the horizontal. Alternatively, the antenna arrays 1310, 1320 may be mounted directly to the ceiling or to a pole or some other structure.

Tilting the antenna arrays as shown in FIG. 13 increases the lateral coverage in the y-z plane. The tilt angle between each antenna array 1310, 1320 and the ceiling may be determined during installation to provide desired lateral coverage given the height of each antenna array above the floor. The two 4×4 MIMO radios connected to the first antenna array 1310 may communicate primarily with devices to the left (as shown) of the access point 1300. Conversely, the two 4×4 MIMO radios connected to the second antenna array 1320 may communicate primarily with devices to the right (as shown) of the access point 1300. Since the radiation from the antenna arrays 1310, 1320 is linearly polarized along the respective y axis, tiling the antenna arrays as shown avoids cross polarization issues. Specifically, tilting the antenna arrays 1310, 1320, as shown in FIG. 13, ensures that a portion of the radiation from each antenna array is vertically polarized (i.e. is polarized along a direction normal to the floor or ground).

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. Elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. An antenna array, comprising:
a first antenna formed on a first surface of a planar substrate,
a second antenna formed on the first surface of the planar substrate displaced from the first antenna in a first direction;
a third antenna formed on the first surface of the planar substrate displaced from the first antenna in a second direction perpendicular to the first direction; and
a fourth antenna formed on the first surface of the planar substrate displaced from the first antenna in both the first and second directions such that the first, second, third, and fourth antennas are disposed in a first 2×2 grid,
wherein each of the first, second, third, and fourth antennas is linearly polarized in the first direction and provides a roughly cardiod radiation pattern in a plane normal to the first direction, a null of the cardiod radiation pattern aligned in the second direction, and
wherein the nulls in the cardiod radiation patterns of the first and second antennas face the third and fourth antennas, respectively, and the nulls in the cardiod radiation patterns of the third and fourth antenna face the first and second antennas, respectively.

2. The antenna array of claim 1, wherein
each of the first, second, third, and fourth antennas is a tapered slot antenna,
wherein open ends of the tapered slots of the first and second antennas face away from the third and fourth antennas, and opens ends of the tapered slots of the third and fourth antennas face away from the first and second antennas.

3. The antenna array of claim 2, wherein
each of the tapered slot antennas is a dual-band tapered slot antenna including two folded stubs.

4. The antenna array of claim 1, wherein
the first, second, third, and fourth antennas are first, second, third, and fourth sub-arrays, each sub-array comprising two tapered slot antenna elements displaced in the first direction and coupled to a common feed point,
wherein open ends of the tapered slots of the first and second sub-arrays face away from the third and fourth sub-arrays, and opens ends of the tapered slots of the third and fourth sub-arrays face away from the first and second sub-arrays.

5. The antenna array of claim 4, wherein
each of the tapered slot antenna elements is a dual-band tapered slot antenna element including two folded stubs.

6. The antenna array of claim 1, wherein
each of the first, second, third, and fourth antennas extend from a common ground plane.

7. The antenna array of claim 1, wherein
each of the first, second, third, and fourth antennas includes a respective feed line formed on a second surface of the planar substrate.

8. The antenna array of claim 1, further comprising:
a fifth antenna formed on the first surface of the planar substrate displaced from the third antenna in the second direction;
a sixth antenna formed on the first surface of the planar substrate displaced from the fifth antenna in the first direction;

a seventh antenna formed on the first surface of the planar substrate displaced from the fifth antenna in the second direction;
a eighth antenna formed on the first surface of the planar substrate displaced from the fifth antenna in both the first and second directions such that the fifth, sixth, seventh, and eighth antennas are disposed in a second 2×2 grid adjacent to the first 2×2 grid; and
a ground plane disposed parallel to and in close proximity to the planar substrate,
wherein each of the fifth, sixth, seventh, and eighth antennas are linearly polarized in the first direction and provide a roughly cardiod radiation pattern in a plane normal to the first direction, a null of the cardiod radiation pattern aligned in the second direction, and
wherein the nulls in the cardiod radiation patterns of the fifth and sixth antennas face the seventh and eighth antennas, respectively, and the nulls in the cardiod radiation patterns of the seventh and eighth antenna face the fifth and sixth antennas, respectively.

9. An access point, comprising:
an antenna array, comprising:
a first antenna formed on a first surface of a planar substrate,
a second antenna formed on the first surface of the planar substrate displaced from the first antenna along a first axis;
a third antenna formed on the first surface of the planar substrate displaced from the first antenna along a second axis normal to the first axis; and
a fourth antenna formed on the first surface of the planar substrate displaced from the first antenna along both the first and second axis such that the first, second, third, and fourth antennas are disposed in a 2×2 grid defined by the first axis and the second axis,
wherein each of the first, second, third, and fourth antennas are linearly polarized in a direction of the first axis and provide a roughly cardiod radiation pattern in a plane normal to the first axis, a null of the cardiod radiation pattern aligned along the second axis, and
wherein the nulls in the cardiod radiation patterns of the first and second antennas face the third and fourth antennas, respectively, and the nulls in the cardiod radiation patterns of the third and fourth antenna face the first and second antennas, respectively.

10. The access point of claim 8, further comprising:
first and second 2×2 multiple input multiple output (MIMO) radios, each of the first and second MIMO radios coupled to two antennas of the first, second, third, and fourth antennas.

11. The access point of claim 9, further comprising:
a radio frequency switch coupled between the first and second MIMO radios and at least two of the first, second, third, and fourth antennas, the switch is configured to selectively couple the first and second MIMO radios to the first, second, third, and fourth antennas in either an omnidirectional mode or a sectored mode.

12. The access point of claim 8, further comprising:
a 4×4 multiple input multiple output (MIMO) radio coupled to the first, second, third, and fourth antennas.

13. The access point of claim 8, the antenna array further comprising:
a fifth antenna formed on the first surface of the planar substrate displaced from the third antenna in the second direction;
a sixth antenna formed on the first surface of the planar substrate displaced from the fifth antenna in the first direction;
a seventh antenna formed on the first surface of the planar substrate displaced from the fifth antenna in the second direction;
a eighth antenna formed on the first surface of the planar substrate displaced from the fifth antenna in both the first and second directions such that the fifth, sixth, seventh, and eighth antennas are disposed in a second 2×2 grid adjacent to the first 2×2 grid; and
a ground plane disposed parallel to and in close proximity to the planar substrate,
wherein each of the fifth, sixth, seventh, and eighth antennas are linearly polarized in the first direction and provide a roughly cardiod radiation pattern in a plane normal to the first direction, a null of the cardiod radiation pattern aligned in the second direction, and
wherein the nulls in the cardiod radiation patterns of the fifth and sixth antennas face the seventh and eighth antennas, respectively, and the nulls in the cardiod radiation patterns of the seventh and eighth antenna face the fifth and sixth antennas, respectively.

14. The access point of claim 13, further comprising:
four 2×2 multiple input multiple output (MIMO) radios, each of the four 2×2 MIMO radios coupled to two antennas of the first, second, third, fourth, fifth, sixth, seventh, and eighth antennas.

15. The access point of claim 13, further comprising:
two 4×4 multiple input multiple output (MIMO) radios, each of the two 4×4 MIMO radios coupled to four antennas of the first, second, third, fourth, fifth, sixth, seventh, and eighth antennas.

16. An antenna array, comprising:
a first group of N antennas, where N is an integer equal to, or greater than, two, formed on a first surface of a planar substrate, the antennas in the first group displaced from each other in a first direction;
a second group of N antennas formed on the first surface of the planar substrate, each of the antennas in the second group displaced from a respective antenna of the first group in a second direction perpendicular to the first direction, such that the antennas of the first and second groups are disposed in a 2×N grid,
wherein each of the antennas in the first and second groups are linearly polarized in the first direction and provide a roughly cardiod radiation pattern in a plane normal to the first direction, a null of the cardiod radiation pattern aligned in the second direction, and
wherein the nulls in the cardiod radiation patterns of the antennas in the first group face the respective antennas of the second group, and the nulls in the cardiod radiation patterns of the antennas in the second group face the respective antennas of the first group.

17. The antenna array of claim 16, wherein
each of the antennas in the first and second groups is a tapered slot antenna,
wherein open ends of the tapered slots of the antennas in the first group face away from the respective antenna of the second group, and opens ends of the tapered slots of the antennas in the second group face away from the respective antennas of the first group.

18. The antenna array of claim 17, wherein
each of the tapered slot antennas is a dual-band tapered slot antenna including two folded stubs.

19. The antenna array of claim 16, wherein
each of the antennas in the first and second groups are sub-arrays, each sub-array comprising two tapered slot antenna elements displaced in the first direction and coupled to a common feed point,
wherein open ends of the tapered slots of the sub-arrays in the first group face away from the respective sub-arrays of the second group, and opens ends of the tapered slots of the sub-arrays in the second group face away from the respective sub-arrays of the first group.

20. The antenna array of claim 19, wherein
each of the tapered slot antenna elements is a dual-band tapered slot antenna element including two folded stubs.

* * * * *